United States Patent [19]

Karla et al.

[11] 4,453,669

[45] Jun. 12, 1984

[54] ELECTRICALLY HEATED GLASS PANE

[75] Inventors: Heinz Karla, Herzogenrath; Mario Roth, Aachen, both of Fed. Rep. of Germany

[73] Assignee: Saint-Gobain Vitrage, France

[21] Appl. No.: 396,766

[22] Filed: Jul. 9, 1982

[30] Foreign Application Priority Data

Jul. 15, 1981 [FR] France .............................. 81 13806

[51] Int. Cl.³ .......................... B60H 1/02; H05B 3/06

[52] U.S. Cl. .............................. 237/12.3 R; 219/203; 219/522; 219/543; 219/548; 244/134 D; 165/43; 338/309; 427/108; 428/210; 428/901

[58] Field of Search ............... 219/203, 541, 522, 543, 219/547, 548; 338/308, 309; 428/195, 433, 901, 210, 192, 209; 427/96, 108; 165/41, 42, 43; 237/12.3 R, 28; 52/171; 296/84 R; 174/68.5; 244/134 D; 65/107

[56] References Cited

U.S. PATENT DOCUMENTS

| | | | |
|---|---|---|---|
| 2,628,299 | 2/1953 | Gaiser | 428/552 |
| 2,864,928 | 12/1958 | Danford | 219/536 |
| 3,553,833 | 1/1971 | Jochim et al. | 29/611 |
| 3,811,934 | 5/1974 | Glaser | 219/543 X |
| 4,023,008 | 5/1977 | Durussel | 219/522 |
| 4,109,044 | 8/1978 | Marriott | 428/210 |
| 4,284,677 | 8/1981 | Herliczek | 428/192 |
| 4,388,522 | 6/1983 | Boaz | 219/522 |

FOREIGN PATENT DOCUMENTS

| | | |
|---|---|---|
| 1690298 | 8/1967 | Fed. Rep. of Germany . |
| 2105845 | 4/1972 | France . |
| 2363256 | 3/1978 | France . |

*Primary Examiner*—Volodymyr Y. Mayewsky
*Attorney, Agent, or Firm*—Pennie & Edmonds

[57] ABSTRACT

An electrically heated glass pane includes a plurality of heating conductors (2) comprising a family of parallel conductors extending between a pair of power supply conductors (3) both disposed on and burnt-in a surface of a glass pane (1). A strip (4), of non-conductive material, covers conductors (3) and extends laterally from the edges of the conductors. The conductors (2) merge into the conductors (3) at a transitional region (7) broadened by an increasing flare so that the cross section of the region, determining the electrical resistance, is greater than the cross section of the conductors (2) providing resistive heating. A layer (12) which covers the same area as the strip (4) may be disposed below each conductor (3), directly on the surface of the glass pane (1). An opening (16) is recessed in layer (12), so that the conductors (3) are connected directly with the surface of glass pane (1). A connecting element (14) for connecting the conductors (3) to a source of power is soldered to the conductors (3) above the opening (16).

12 Claims, 3 Drawing Figures

ELECTRICALLY HEATED GLASS PANE

DESCRIPTION

Technical Field

The invention relates to an electrically heated glass pane having utility as a window of an automobile or other vehicle. Particularly, the glass pane supports a plurality of relatively narrow heating conductors connected at their ends to a pair of power supply conductors, all comprising an electrically conductive ceramic mass pressed-on and burnt-in to the surface of the glass pane, and an enamel-and glaze-like non-conductive layer of ceramic color for protection disposed on the power supply conductors and extending laterally of the power supply conductors.

BACKGROUND OF THE INVENTION

Electrically heated glass panes are known to the prior art. A fairly representative prior art teaching of a glass pane of this type may be found in German Offenlegungsschrift No. 16 90 298.

The German publication discloses a glass pane including a pair of power supply conductors and a plurality of heating conductors connected at their opposite ends to the power supply conductors. Each of the heating conductors is characterized by a relatively narrow band. The German publication, also, discloses a cover which serves as a protective layer for the conductive layer therebelow. The cover layer is applied as a printable paste on each of the conductors previously pressed-on and dried, and both of the layers are burnt-in in the surface of the glass pane in a single heat treatment operation.

According to the German publication the heating conductors are of substantially constant cross section throughout their length, even at the point of transition or junction with the power supply conductors.

It has been recognized that the protective layer, if it is to provide the desired function, normally extends laterally of the power supply conductors of the conductive layer. Thus, not only are the power supply conductors covered, but, also, the points of transition of the heating conductors into the power supply conductors are covered as well. Accordingly, these points of transition no longer are accessible from the outside. And, weak points in connection of the several heating conductors and power supply conductors which may result from the printing process are not correctable. A resultant problem is the possible breakdown and interruption of the electric path at these weak points through localized overheating.

In case of electrically heated glass panes, where the heating conductors are provided with a galvanically applied metal, reinforcing layer, the protective layer may only be applied prior to the galvanizing process and the galvanically applied layer only may reach to the limiting edges of the protective layer. This factor may be tolerated if it becomes necessary to apply a protective layer on the power supply conductors. Thus, a protective layer is necessary when the power supply conductors are disposed close to the edge of the glass pane, and particularly in the region serving as an edging of the glass pane in the frame of the body, when the glass pane is attached to the frame by an adhesive. To this end, the adhesive masses or primary layers for enhancement of adhesion oftentimes have an unfavorable influence on power supply conductors. The protective layer, as set out, prevents access to the points of connection of the heating conductors and power supply conductors with the consequences as set out, also. In case of electrically heated glass panes having both galvanically reinforced heating conductors and a protective layer over the power supply conductors, as well as laterally of the power supply conductors, the problem of possible weak places in the transition area between heating conductors and power supply conductors is compounded. This is because the cross section of the heating conductors, between the limiting edges of the protective layer, is increased by the metal, reinforcing layer.

SUMMARY OF THE INVENTION

The invention seeks to overcome the aforementioned problems and disadvantages in an electrically heated glass pane including a protective layer over the power supply conductors of the conductive layer. Thus, the electrically heated glass pane of the invention provides lasting operational safety.

An important aspect of the invention resides in the manner of connection of each terminal section of the heating conductors to the power supply conductors of the conductive layer, the latter of which are disposed below a protective layer. In particular, the terminal sections of the heating conductors are of cross section greater than that of the increments of the heating conductor, even if provided with a metal, reinforcing layer, between the edges of the protective layer. Thus, the electric resistance of the heating conductors in the terminal sections is less than the electric resistance of the heating conductor which provides the necessary heat for heating.

According to the invention, the terminal sections providing a transition connection of the heating conductors and power supply conductors located below the protective layer overcomes a possible occurrence of weak spots which may lead to overheating and possible breakdown of the heating conductors at these locations.

The terminal sections of the heating conductors preferably are developed so that they are broadened over a distance which is greater than the distance by which the protective layer laterally projects beyond the limiting edge of the power supply conductors. In this manner, a possibly harmful influence may be eliminated in the event of a possible shifting of the protective layer because of pressure tolerances in mounting the glass pane to a frame.

In a further development of the invention, a further layer of a non-transparent ceramic color, coextensive with the protective layer is disposed directly on the surface of the glass pane below the power supply conductors. This arrangement has the advantage, even on the side of the glass pane visible also from the outside, that there will be presented to the eye an uninterrupted, uniform, frame-like marginal strip.

Further characteristics of the invention will become clear as the description of the several embodiments of the electrically heated glass pane continues and those general discussions, above, will be expanded upon.

BEST MODE FOR CARRYING OUT THE INVENTION

The present invention relates to an electrically heated glass pane of an automobile or other motor vehicle. As may be common in the prior art the electrically heated glass pane comprises the rear window of the automobile Referring to FIG. 1, a glass pane 1 carries a plurality of conductors 2 arranged in a family of substantially parallel strips which extend horizontally across the glass pane from a conductor 3 extending along one vertical edge of the glass pane to a second, like conductor extending along the other vertical edge (not shown) of the same glass pane. Conductors 2 are the heating conductors, while conductors 3, relatively broader in width, are the power supply conductors to which each heating conductor is connected at its ends.

Figure 1:
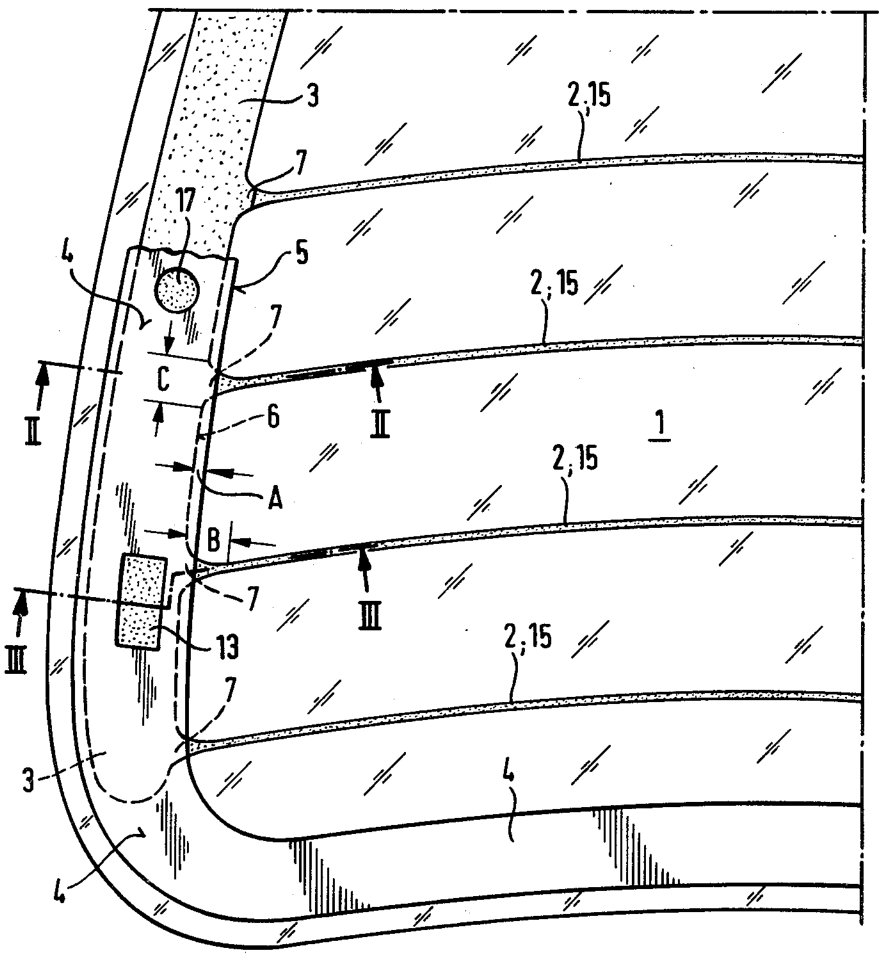
FIG. 1 is a view in elevation of a portion of a glass pane including the electric heating structure of the present invention.

With continued reference to FIG. 1 the power supply conductors both extend from a location within the vicinity of a lower corner of the glass pane to a somewhat similar location within the vicinity of each upper corner. Each power supply conductor, further, is spaced a small distance inward from the vertical edges of the glass pane.

As may be conventional in the prior art, the conductors 2 and 3 are disposed on the inner surface of glass pane 1, that is, toward the passenger compartment of the automobile A strip 4 is disposed along the vertical edges of the glass pane over the power supply conductors 3. The strip provides a protective layer for the power supply conductors and comprises an enamel-and glaze-like, electrically insulating ceramic stoving mass. The strip, further, provides a protective layer for a small length of the heating conductors at their transitional junction with the power supply conductors.

While in one embodiment of the invention a pair of strips 4 may reside in a disposition over respective power supply conductors 3 along the vertical edges of glass pane 1, it is also contemplated, however, that strip 4 may extend completely around the perimeter of the glass pane. This embodiment of the invention is illustrated in FIG. 1.

When the strip 4 extends completely around the perimeter of the glass pane, it may be considered to provide a protective function in addition to that of protection of the power supply conductors, not to mention an aesthetic function Thus, the strip, as a closed frame along the entire periphery of glass pane 1, creates throughout this length a non-transparent zone to cover up and obscure the limitation of the adhesive layer connecting the glass pane to a window frame which normally does not extend in a regular fashion. The adhesive layer will be described below. And, in its second protective function, the strip provides a barrier to passage of ultraviolet rays which otherwise may have a disadvantageous effect on the adhesive layer, and its adhesive capability.

Each heating conductor 2 is increased in width within a region 7 at its junction with power supply conductors 3. The increase in width is characterized by a smooth outward transitional flare along a length B of each heating conductor (see FIG. 1). The length B may be from about 4 to 8 mm, a distance measured from the point at which the outward flare commences to the edge 6 of each power supply conductor. By way of further non-limiting exemplary data, thereby to better describe the invention, the heating conductors preferably are narrow strips having a width of about 0.4 to 1.2 mm. The power supply conductors are relatively broader in width, yet they are narrower than strip 4, as may be seen in FIG. 1. The strip may have a width of about 1 to 3 cm and extends laterally of the edges (and the ends in the event that strip 4 extends only along the length of the power supply conductors) of the power supply conductors through a distance of about 2 mm. This is considered to be a suitable differential in width to assure that strip 4 will completely cover the power supply conductors when glass pane 1 is subjected to pressure within the frame around the window opening and possible shift of strip 4 because of pressure tolerances. Thus, the differential is considered adequate to eliminate any possible harmful influence in the event of slight shift, and the power supply conductors will remain completely covered in every case.

Figure 2:
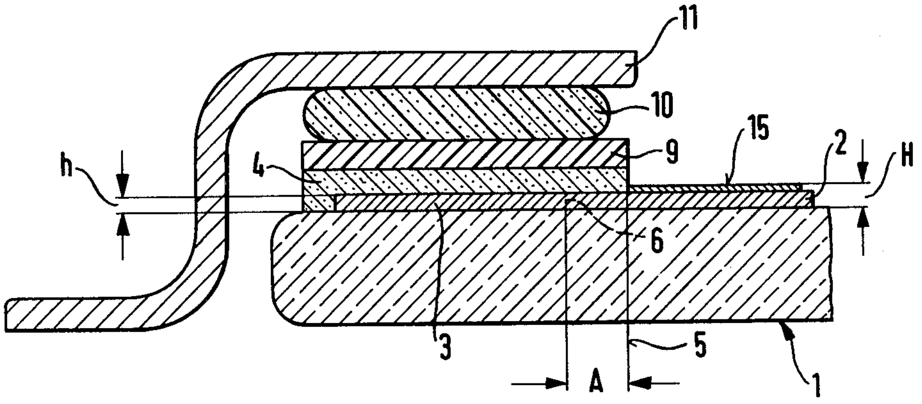
FIG. 2 is an enlarged view in section as seen along the line II—II in FIG. 1, illustrating the glass pane adhered in an opening in the body of an automobile.
Figure 3:
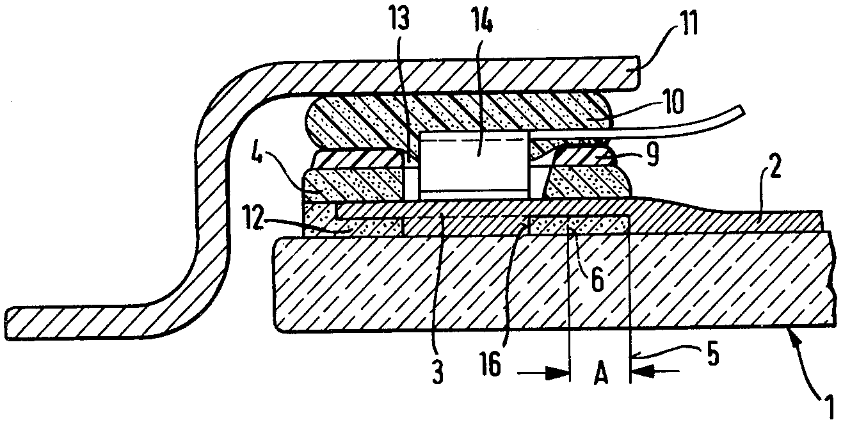
FIG. 3 is an enlarged view in section as seen along the line III—III in FIG. 1, likewise illustrating the glass pane adhered in an opening in the body of an automobile.

The portion of the surface of strip 4 which extends beyond the power supply conductors, on both sides (and possibly their ends, as well),is illustrated as distance A in FIGS. 1-3.

The width of the region 7 at the transitional junction of each heating conductor 2 and each power supply conductor 3 where the flare is at a maximum is illustrated by dimension C. Dimension C is of an order of magnitude about ten times that of the width of the heating conductors throughout their major length.

Referring to FIG. 2 which may be considered a first form of the invention, it may be seen that a layer 15 is superposed both on and along each heating conductor 2. The layer comprises a galvanically applied metal, comprising a reinforcement, which extends from an edge 5 of strip 4. The reinforcement layer increases the height of each heating conductor which otherwise substantially corresponds in height to that of power supply conductors 3. The galvanically applied reinforcement layer on the heating conductors may have the result of increasing electrical conductivity at the point at which the layer ends and strip 4 begins. The transition region 7 comprising the outward flare at the ends of each heating conductor along the length B, thus, avoids a sudden drop in the electric conductivity at that point. To this end, properly increased measurements in width provide a conductivity in the heating conductor throughout region 7 which corresponds to the conductivity of the layered heating conductors 2, 15.

The glass pane 1 is adhered to frame 11 of the automobile within the resulting window opening. An adhesive layer 10 is provided for this purpose and may be disposed as a bead on an inner surface of the frame around the opening. Any particular adhesive as may be conventional in the art may be used for this purpose. A further layer 9 or primary layer is disposed between the adhesive 10 and protective strip 4 for purposes of enhancing the degree of adhesion of the glass pane 1 to frame 11. In this particular form of the invention, protective strip 4 which extends a few millimeters laterally of the power supply conductors 3 also provides a barrier between the power supply conductors and layer 9 which otherwise may deleteriously attack the power supply conductors.

The height of the printed conductors is represented by the dimension h, while the height of the heating conductors increased by the thickness of metal layer 15 is represented by the dimenion H.

Referring to FIG. 3 which may be considered a second form of the invention, a layer 12 is disposed directly on glass pane 1. The layer 12 is of the same material as that of strip 4, and coextensive with the strip. The layer 12 serves a function which primarily is aesthetic, namely to present an uninterrupted, uniform, frame-like marginal strip when the glass pane 1 is mounted in frame 11 and viewed from the outside.

The power supply conductors 3 and the transitional region 7 of heating conductors 2 are disposed between strip 4 and layer 12.

The strip 4 is provided with an opening or window 13, and layer 12 is provided with an opening or window 16 substantially coextensive with window 13. Actually, the coextensive windows are formed in each of the power supply conductors 3. In the overall process of application of the printed-on compound of conductive metal, such as a conductive silver compound, forming the conductors, which ultimately is burnt-in the compound will migrate through window 16 so that the power supply conductors 3 and the heating conductors 2 will be connected directly to the glass surface.

A connecting element 14 for connecting a source of power to each power supply conductor is located within each window and soldered directly to the respective power supply conductor. Since the power supply conductors are connected directly to the surface of the glass pane any disadvantageous influence on the soldered connection will be avoided. Thus, it was found that a continuous layer 12, that is, a layer without the formation of window 16, had a tendency to diffuse into the power supply conductors during the soldering process with a resulting impairment of the wettability of the power supply conductor by the solder. This tendency of diffusion is eliminated or substantially eliminated by the provision of a window through layer 12.

As in the form of the invention of FIG. 2, the glass pane 1 is adhered to frame 11 through the agency of an adhesive layer 10 and the additional layer 9 which, again, enhances the degree of adhesion. The adhesive layer 10 forms somewhat about the connector 14 within window 13, thereby to provide added stability to the solder connection.

According to a preferred process the rear window of FIG. 2 may be formed by first creating a silk-screen pattern which corresponds to the arrangement of heating conductors 2 and power supply conductors 3 to be printed on the surface of glass pane 1. The pattern, of course, will include the region 7 providing the transition between each end of each heating conductor and the opposed power supply conductors. The region 7 will be developed in accordance with the data relating to the length and width B and C, respectively, set out above. The silk-screen pattern may be formed in a manner as described in U.S. Pat. No. 3,553,833, the disclosure of which is included herein by reference.

An electrically conducting ceramic paste is printed on the surface of glass pane 1 with the aid of the silk-screen pattern. The glass pane, then, is allowed to dry for a period of from five to ten minutes at a temperature of about 80° C.

Protective strip 4 is applied during a second printing process using a second silk-screen pattern produced in a manner corresponding to the manner of production of the firstmentioned silk-screen pattern. The protective strip, printed on the surface of the power supply conductors 3, will extend laterally of the power supply conductors for the purposes previously discussed. The second silk-screen pattern will provide for windows 13 recessed on the power supply conductors. In this manner the power supply conductors are free so that suitable connecting elements 14 may be soldered to the power supply conductors. The second silk-screen pattern, additionally, will provide for a plurality of openings 17 (only one is shown in FIG. 1). The openings permit contact between the power supply conductors and a galvanizing bath.

Strip 4 may be formed by application of a printing paste of electrically non-conductive material supplied by the firm Degussa. One paste that has been used successfully is an enamel- and glaze-like ceramic, color 14 710/80 392.

The strip 4, likewise, is allowed to dry. When dried, the glass pane 1 is heated to a bending or prestress temperature. The glass pane may be bent, as desired, and prestressed by abrupt cooling.

Thereafter, the glass pane is subjected to a galvanizing process according to the process described in the abovementioned U.S. Pat. No. 3,553,833. During the process, in the galvanizing bath, the glass pane is contacted through the openings 17. Further, during the process, copper and nickel is deposited forming layer 15 superposed along the heating conductors 2 for reinforcement.

The form of the invention of FIG. 3 is produced in a substantially similar manner. The major difference in the two processes resides in the printing of the layer 12 comprising a framing layer directly atop the surface of the glass pane 1. Layer 12 may be printed on the glass pane using the same silk-screen pattern which is used for printing the strip 4. The material of layer 12 preferably will be the same material which comprises the strip, also.

We claim:

1. An electrically heated glass pane adapted for use as a window for an automobile comprising:

(a) a glass pane, (b) a pair of power supply conductors, (c) a plurality of heating conductors, each heating conductor connected at a terminal section to said power supply conductors, and each of said conductors formed of an electrically conductive material disposed on a surface of said glass pane, (d) a strip both covering said power supply conductors and extending laterally of the same providing a protective layer, said strip formed of an electrically insulating material, and wherein each terminal section of said heating conductors below said strip is widened throughout a transition region toward said power supply conductor so that the electric resistance of said terminal section is less than the electric resistance of increments of each heating conductor between said terminal sections.

2. The electrically heated glass pane of claim 1 wherein the length of each terminal section of said heating conductors is greater than the width of that portion of said strip extending laterally of said power supply conductors.

3. The electrically heated glass pane of claim 2 wherein the length of each said terminal section is about 4 to 8 mm, and wherein said strip extends laterally of each said power supply conductor through a distance of about 1 to 3 mm.

4. The electrically heated glass pane of claims 1 or 2 wherein said terminal sections are outwardly flared throughout said transition region and of maximum width at the point of connection with said power supply conductors.

5. The electrically heated glass pane of claim 4 wherein said heating conductors at said point of connection have a dimension of about ten times that of said heating conductors between said terminal sections.

6. The electrically heated glass pane of claim 1 comprising:

(a) a recess formed in each said strip, and (b) an element received in each said recess and connected to said power supply conductors, said elements adapted to connect said power supply conductors and said heating conductors across a source of power.

7. The electrically heated glass pane of claim 1 wherein said strip extends completely around said glass pane adjacent its marginal edge, and wherein said strip of electrically insulating material comprises an enamel- and glaze-like ceramic color.

8. The electrically heated glass pane of claim 1 comprising:

(a) a layer of material disposed on said glass pane below each said power supply conductor, said layer and said strip being coextensive in outline and wherein each said strip and each said layer comprise an electrically insulating material of non-transparent enamel- and glaze-like ceramic color.

9. The electrically heated glass pane of claim 8 comprising:

(a) a recess formed in each said strip, (b) a recess coextensive with said strip recesses formed in each layer whereby said power supply conductors will be in surface contact with said glass pane, and (c) an element received in each said recess and connected to said power supply conductors, said elements adapted to connect said power supply conductors and said heating conductors across a source of power.

10. The electrically heated glass pane of claim 1 comprising:

(a) a reinforcing metal layer, said reinforcing metal layer disposed on said heating conductors along their length between facing edges of said strip.

11. The electrically heated glass pane of claim 10 wherein the cross section of said terminal sections of said heating conductors below said strip is at least as large as the cross section of said heating conductors and reinforcing metal layer between said strips.

12. The combination comprising:

(a) a vehicle body, (b) a frame element for supporting a window and, in turn, supported by said body, (c) a window including:

(1) a glass pane, (2) a pair of power supply conductors, (3) a plurality of heating conductors, each heating conductor connected at a terminal section to said power supply conductors, and each of said conductors formed of an electrically conductive material disposed on a, surface of said glass pane, (4) a strip both covering said power supply conductors and extending laterally of the same providing a protective layer, said strip formed of an insulating material, and wherein each terminal section of said heating conductors below said strip is widened throughout a transition region toward said power supply conductors so that the electric resistance of said terminal sections is less than the electric resistance of increments of each heating conductor between said terminal sections, and (d) adhesive means for adhesively securing said window within said frame.

* * * * *